(12) United States Patent
Chen et al.

(10) Patent No.: US 10,609,355 B2
(45) Date of Patent: Mar. 31, 2020

(54) DYNAMICALLY ADJUSTING SAMPLING OF A REAL-TIME DEPTH MAP

(71) Applicant: MOTOROLA MOBILITY LLC, Chicago, IL (US)

(72) Inventors: Yin Hu Chen, Deerfield, IL (US); Valeriy Marchevsky, Glenview, IL (US); Susan Yanqing Xu, Westmont, IL (US)

(73) Assignee: Motorola Mobility LLC, Chicago, IL (US)

( * ) Notice: Subject to any disclaimer, the term of this patent is extended or adjusted under 35 U.S.C. 154(b) by 237 days.

(21) Appl. No.: 15/796,425

(22) Filed: Oct. 27, 2017

(65) Prior Publication Data

US 2019/0132570 A1    May 2, 2019

(51) Int. Cl.
  *H04N 13/139*   (2018.01)
  *H04N 13/296*   (2018.01)
  *H04N 5/232*    (2006.01)
  *G06T 7/50*     (2017.01)
  *H04N 13/00*    (2018.01)

(52) U.S. Cl.
  CPC .......... *H04N 13/139* (2018.05); *G06T 7/50* (2017.01); *H04N 5/232* (2013.01); *H04N 13/296* (2018.05); *H04N 2013/0081* (2013.01); *H04N 2013/0085* (2013.01); *H04N 2013/0096* (2013.01)

(58) Field of Classification Search
  CPC .. H04N 13/271; H04N 13/139; H04N 13/296; H04N 5/232; H04N 13/128; H04N 13/239; G06T 7/50
  See application file for complete search history.

(56) References Cited

U.S. PATENT DOCUMENTS

| | | | |
|---|---|---|---|
| 7,295,697 B1* | 11/2007 | Satoh ............. | G06T 19/006 382/154 |
| 9,936,208 B1* | 4/2018 | Brailovskiy ........ | H04N 19/42 |
| 2014/0267616 A1* | 9/2014 | Krig ............... | H04N 13/271 348/46 |
| 2014/0267617 A1* | 9/2014 | Krig ............... | H04N 5/349 348/46 |
| 2015/0381948 A1* | 12/2015 | Renkis ............. | H04N 7/181 348/47 |

(Continued)

*Primary Examiner* — David E Harvey
(74) *Attorney, Agent, or Firm* — Yudell Isidore PLLC

(57) ABSTRACT

A method, a system, and a computer program product for dynamically adjusting sampling of a depth map based on detected motion in a current scene. The method includes capturing real-time scan data at a first resolution by a first camera and a second camera of an image capturing device. The method further includes synchronizing a first plurality of frames of the real-time scan data to create a plurality of synchronized frames at a first frame rate. The method further includes analyzing the synchronized frames to determine whether motion exists. The method further includes, in response to determining motion exists: determining, based on the plurality of synchronized frames, a rate of motion within the current scene; and dynamically calculating a target resolution and a target frame rate for a real-time depth map. The method further includes generating a real-time depth map at the target resolution and target frame rate.

18 Claims, 6 Drawing Sheets

(56) References Cited

U.S. PATENT DOCUMENTS

2016/0317811 A1\* 11/2016 Greenberg .......... A61N 1/36046
2017/0045813 A1\* 2/2017 Kawabe ................ G03B 25/00
2019/0058859 A1\* 2/2019 Price ...................... G06T 7/521

\* cited by examiner

DYNAMICALLY ADJUSTING SAMPLING OF A REAL-TIME DEPTH MAP

BACKGROUND

1. Technical Field

The present disclosure generally relates to electronic devices having camera sensors and in particular to a method for dynamically adjusting sampling of a depth map generated for images taken with camera sensors.

2. Description of the Related Art

Many electronic devices, such as cellular phones, are equipped with cameras that can be used to capture images and/or video in a field of view. Some cameras may be used to generate a depth map that identifies a depth of the current scene in a third dimension. The depth map may be used to assist in focusing a lens of a camera for capturing images and/or video. However, the calculations of the depth map are time consuming and the depth map is only useful for focusing camera lenses so long as the depth map is current for objects in the scene. In order to achieve real-time performance, many modern solutions down-sample a depth map, such as by a 4×4 down-sampled image, and utilize box average filtering to achieve a real-time depth map. However, in the resulting down-sampled depth map many details in the current scene may be lost, which causes the depth map to be inaccurate for the current scene. Inaccurate depth maps, when combined with image/video data, may cause abnormalities to be present in the final image/video data.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
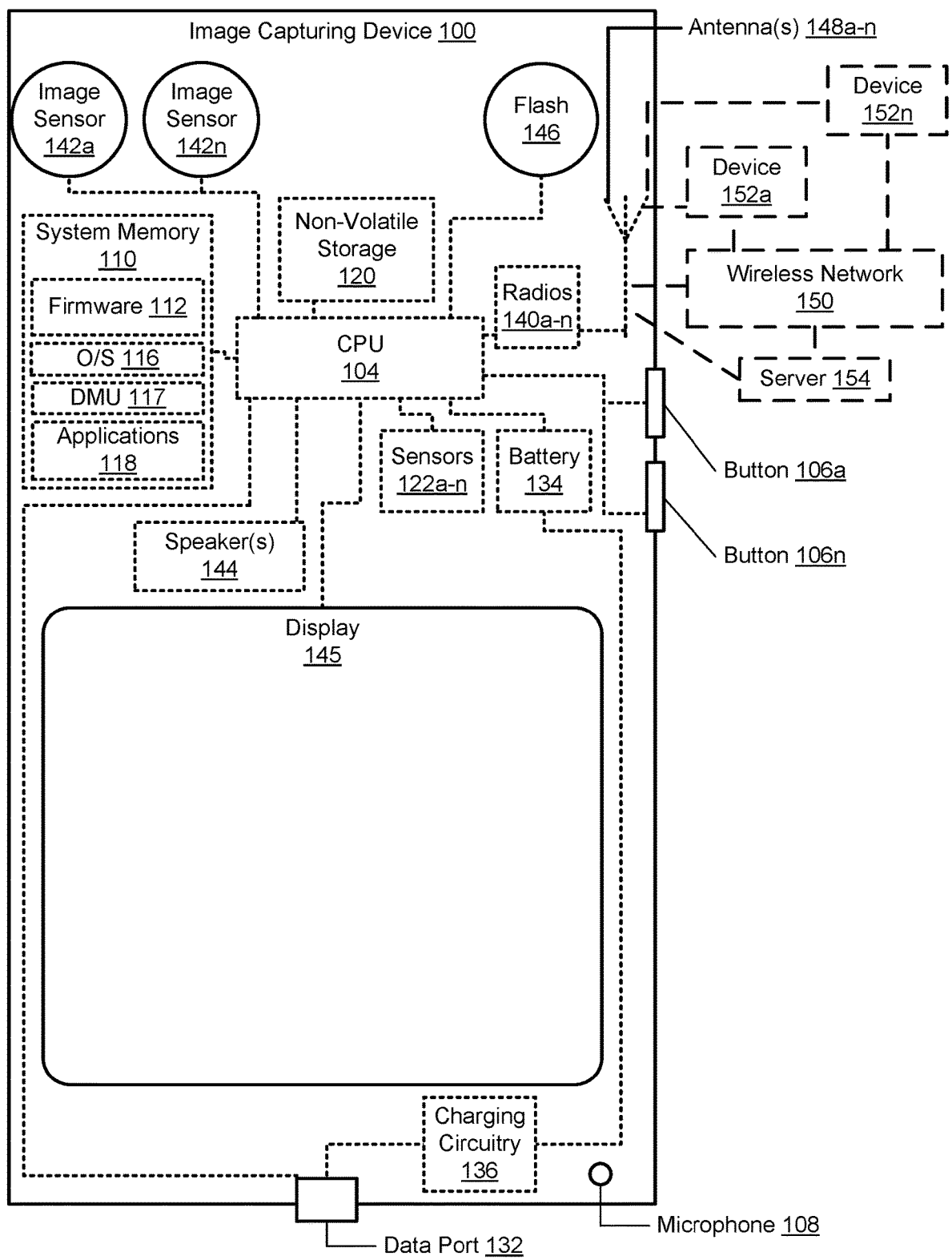
FIG. 1 illustrates an image capturing device within which certain aspects of the disclosure can be practiced, in accordance with one or more embodiments.

The illustrative embodiments provide a method, a system, and a computer program product for dynamically adjusting sampling of a depth map based on detected motion in a current scene. The method includes capturing real-time scan data at a first resolution by a first camera and a second camera of an image capturing device. The method further includes synchronizing, by a processor, a first plurality of frames of the real-time scan data captured by the first camera with a second plurality of frames captured by the second camera to create a plurality of synchronized frames at a first frame rate. The method further includes analyzing the plurality of synchronized frames to determine whether motion exists within the current scene. The method further includes, in response to determining motion exists within the current scene: determining, based on the plurality of synchronized frames, a rate of motion within the current scene; and dynamically calculating a target resolution and a target frame rate for real-time depth map, based on the rate of motion. The method further includes generating, from the real-time scan data, a real-time depth map at the target resolution and target frame rate.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within image capturing device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Now turning to FIG. 1, there is illustrated an example image capturing device 100 within which one or more of the described features of the various embodiments of the disclosure can be implemented. In at least one embodiment, image capturing device 100 can be any electronic device that is equipped with at least one image sensor. Example image capturing devices can include, but are not limited to, a desktop computer, a monitor, a notebook computer, a mobile phone, a digital camera, a video recorder, or a tablet computer. Image capturing device 100 includes at least one processor or central processing unit (CPU) 104. CPU 104 is coupled to non-volatile storage 120 and system memory 110, within which firmware 112, operating system (OS) 116, depth map utility (DMU) 117, and applications 118 can be stored for execution by CPU 104. According to one aspect, DMU 117 executes within image capturing device 100 to perform the various methods and functions described herein. In one or more embodiments, DMU 117 dynamically adjusts sampling of a depth map based on a detected motion in a current scene. For simplicity, DMU 117 is illustrated and described as a stand-alone or separate software/firmware/logic component, which provides the specific functions and methods described below. However, in at least one embodiment, DMU 117 may be a component of, may be combined with, or may be incorporated within firmware 112, or OS 116, and/or within one or more of applications 118.

As shown, image capturing device 100 may include input devices and output devices that enable a user to interface with image capturing device 100. In the illustrated embodiment, image capturing device 100 includes image sensors 142a-n, flash 146, display 145, hardware buttons 106a-n, microphone(s) 108, and speaker(s) 144. Image sensors 142a-n are used to captured image data in a current scene. Image sensors 142a-n may include color camera sensors (e.g., Bayer camera sensors) and/or monochrome camera sensors. While two image sensors (or cameras) are illustrated, in other embodiments, image capturing device 100 can include additional cameras. Flash 146 is utilized to illuminate objects in a scene with artificial light. Hardware buttons 106a-n are selectable buttons that are used to receive manual/tactile input from a user to control specific operations of image capturing device 100 and/or of applications executing thereon. In at least one embodiment, hardware buttons 106a-n may also include, or may be connected to, one or more sensors (e.g. a fingerprint scanner) and/or may be pressure sensitive. Hardware buttons 106a-n may also be directly associated with one or more functions of a graphical user interface (not pictured) and/or functions of an OS, application, or hardware of image capturing device 100. In at least one embodiment, hardware buttons 106a-n may include a keyboard. Microphone(s) 108 may be used to receive spoken input/commands from a user. Speaker(s) 144 is used to output audio signals.

CPU 104 is also coupled to sensors 122a-n and display 145. Sensors 122a-n can include, but are not limited to including, at least one of: infrared (IR) sensors, time-of-flight emitters/receivers, structured light emitters/receivers, thermal sensors, light sensors, motion sensors and/or accelerometers, proximity sensors, and camera/image sensors. Display 145 is capable of displaying text and media content—including images and video, and/or a graphical user interface (GUI) associated with or generated by firmware and/or software executing on image capturing device 100. The GUI can be rendered by CPU 104 for viewing on display 145, in at least one embodiment, or can be rendered by a graphics processing unit (GPU) (not separately shown), in another embodiment. In at least one embodiment, display 145 is a touch screen that is capable of receiving touch/tactile input from a user of image capturing device 100, such as when the user is interfacing with a displayed (or partially displayed) GUI. In at least one embodiment, image capturing device 100 can include a plurality of virtual buttons or affordances that operate in addition to, or in lieu of, hardware buttons 106a-n. For example, image capturing device 100 can be equipped with a touch screen interface and provide, via a GUI, a virtual keyboard or other virtual icons for user interfacing therewith.

Image capturing device 100 also includes data port 132 (e.g., a universal serial bus (USB) port), battery 134, and charging circuitry 136. Data port 132 can operate as a charging port that receives power via an external charging device (not pictured) for charging battery 134 via charging circuitry 136. Battery 134 may include a single battery or multiple batteries for providing power to components of image capturing device 100. In at least one embodiment, battery 134 may include at least one battery that is removable and/or replaceable by an end user. In another embodiment, battery 134 may include at least one battery that is permanently secured within/to image capturing device 100.

Data port 132 may also function as one of an input port, an output port, and a combination input/output port.

Image capturing device 100 may also include one or more wireless radios 140a-n and can include one or more antenna(s) 148a-n that enable image capturing device 100 to wirelessly connect to, and transmit and receive voice and/or data communication to/from, one or more other devices, such as devices 152a-n and server 154. As a wireless device, image capturing device 100 can transmit data over a wireless network 150 (e.g., a Wi-Fi network, cellular network, Bluetooth® network (including Bluetooth® low energy (BLE) networks), a wireless ad hoc network (WANET), or personal area network (PAN)). In one embodiment, image capturing device 100 may be further equipped with infrared (IR) device (not pictured) for communicating with other devices using an IR connection. In another embodiment, wireless radios 140a-n may include a short-range wireless device, including, but not limited to, a near field communication (NFC) device. In still another embodiment, image capturing device 100 may communicate with one or more other device(s) using a wired or wireless USB connection.

Figure 2:
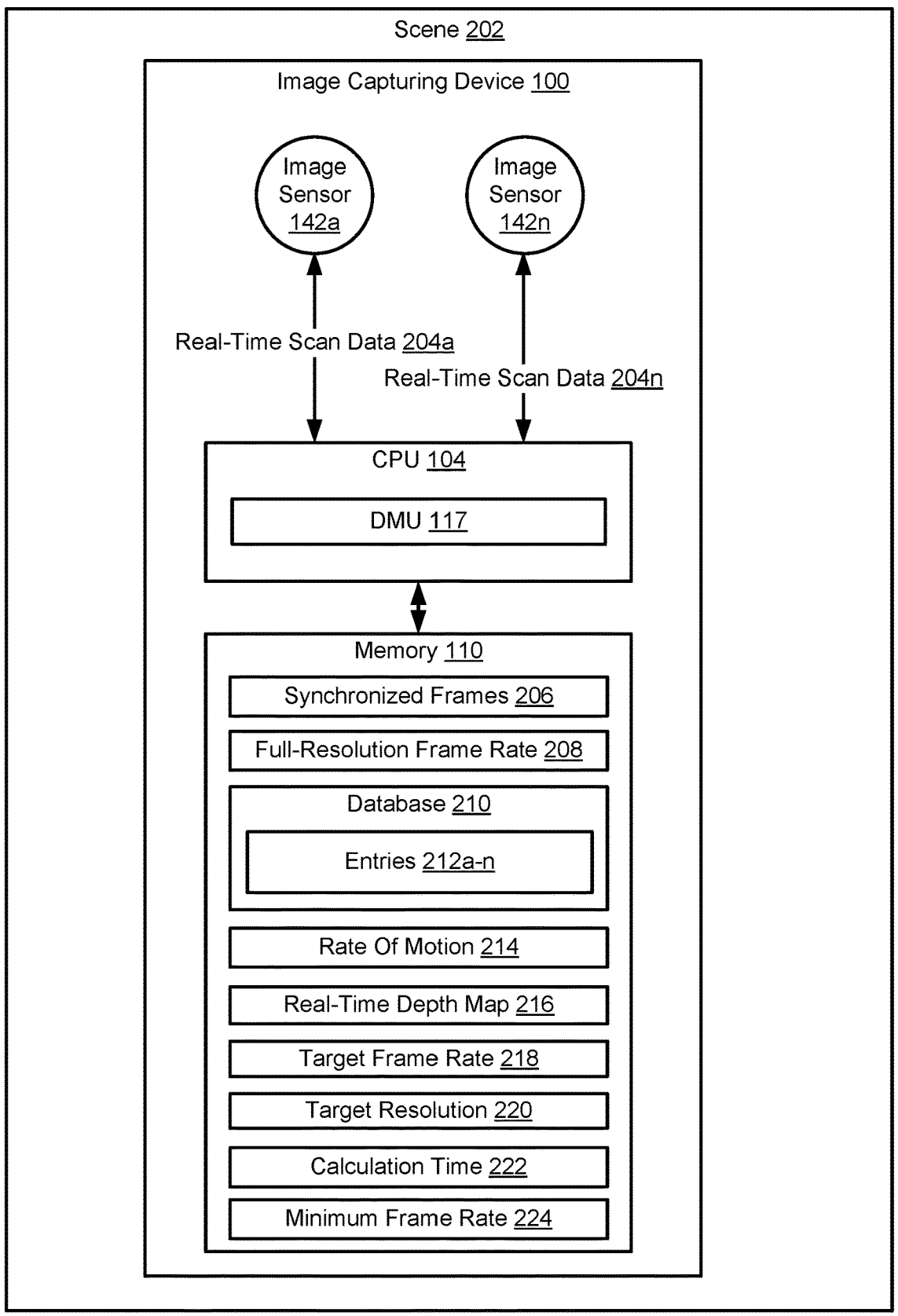
FIG. 2 illustrates an example image capturing device configured to dynamically adjust sampling of a depth map based on detected motion in a current scene, in accordance with one or more embodiments.

FIG. 2 is a block diagram illustrating additional functional components within example image capturing device 100. Image capturing device 100 is configured to dynamically adjust sampling of a depth map based on detected motion in a current scene, in accordance with one or more embodiments of the present disclosure. As illustrated, image capturing device 100 includes CPU 104, which executes DMU 117. Image capturing device 100 also includes memory 110 and image sensors 142a-n.

In one or more embodiments, image sensors 142a-n are utilized by CPU 104 to simultaneously capture real-time scan data 204a-n of a current scene (e.g., scene 202). Real-time scan data 204a-n is a live-depiction of scene 202 as captured by a corresponding image sensor 142a-n. Real-time scan data 204a-n is captured in a native and/or full resolution of each image sensor 142a-n. In one or more embodiments, real-time scan data 204a-n is continually captured by image sensors 142a-n. In one or more embodiments, a plurality of frames in real-time scan data 204a and a plurality of frames of real-time scan data 204n are synchronized by CPU 104 to create synchronized frames 206. Synchronized frames 206 provide a combined view of a current scene over a period of time. CPU 104 analyzes synchronized frames 206 over the period of time to determine whether motion exists in a current scene. For example, during the analysis of synchronized frames 206, CPU 104 may identify a motion of an object (e.g., a bouncing ball) across the current scene. It should be noted that CPU 104 may detect motion in any object in the current scene, including inanimate objects or living beings, such as persons or animals.

In one or more embodiments, in response to determining from synchronized frames 206 that no motion is detected in the current scene (i.e., that the current scene is a static scene), CPU 104 combines real-time scan data 204a-n at a full-resolution frame rate 208 to create real-time depth map 216. Real-time depth map 216 identifies a real-time estimated distance from image capturing device 100 to each object within the current scene. In one or more embodiments, full-resolution frame rate 208 is a pre-established frame rate, such as five frames per second (FPS), at which CPU 104 may continually generate real-time depth map 216 at the native/full resolution of the real-time scan data captured by image sensors 142a-n. In another embodiment, in response to determining from synchronized frames 206 that no motion is detected in the current scene, applies a pre-determined down-sampling ratio (e.g., a 2×2 down-sampling ratio) to real-time scan data 204a-n to generate real-time depth map 216. In this embodiment, the down-sampling ratio applied to real-time scan data 204a-n may be associated with processing capabilities of one or more components of image capturing device 100, such as CPU 104. In one or more embodiments, real-time depth map 216 is calculated in real time. In another embodiment, real-time depth map 216 may have a slight delay (e.g., 5 ms) due to a calculation time (by CPU 104) of each frame of real-time depth map 216

In one or more embodiments, in response to detecting movement between synchronized frames 206 that indicates there is motion in the current scene, CPU 104 determines rate of motion 214 for synchronized frames 206. Rate of motion 214 identifies a degree and/or speed of movement of one or more objects in the current scene over the course of synchronized frames 206. To calculate rate of motion 214, CPU 104 analyzes synchronized frames 206 to identify a plurality of objects. CPU 104 then analyzes the motion of the identified objects within the current scene throughout the synchronized frames 206. For example, CPU 104 can measure a movement of at least one object, such as a bouncing ball, over the course of synchronized frames 206, and assign a rate of motion 214 based on the detected movement of at least one object within synchronized frames 206. Rate of motion 214 is a characterization of movement of at least one object within scene 202 and is used to establish a resolution and frame rate for a real-time depth map (e.g., real-time depth map 216). In one embodiment, rate of motion 214 is a numeric value corresponding the level/degree of motion of at least one moving object in the current scene. In another embodiment, CPU 104 may further correlate the rate of motion 214 to a particular motion range, such as: high rate of motion or low rate of motion. For example, a ball bouncing quickly across the current scene may be assigned a high rate of motion, while leaves blowing gently in the wind may be assigned a slow rate of motion. In another embodiment, rate of motion 214 also identifies a number of objects that are moving in a scene. In this embodiment, the number of moving objects in rate of motion 214 can be used to calculate an optimal resolution and frame rate for real-time depth map 216.

In response to determining rate of motion 214, CPU 104 dynamically calculates target frame rate 218 and target resolution 220 for real-time depth map 216 based on rate of motion 214. Target frame rate 218 is a new frame rate that is applied to real-time scan data 204a-n to generate real-time depth map 216. In one or more embodiments, target frame rate 218 replaces full-resolution frame rate 208. In one or more embodiments, target frame rate 218 is a higher frame rate than full-resolution frame rate 208. Target frame rate 218 is calculated based on rate of motion 214 and increases as rate of motion 214 increases. For example, for scenes having a high rate of motion, CPU 104 calculates a high target frame rate 218, such as 30 FPS. In another example, for scenes having a lower rate of motion, CPU 104 calculates a lower target frame rate 218, such as 15 FPS. It should be noted that the above target frame rates are provided as examples and that target frame rate 218 may include other frame rates. Target resolution 220 is a new resolution that is applied to real-time scan data 204a-n to generate real-time depth map 216. In one or more embodiments, target resolution 220 replaces full-resolution frame rate 208 for real-time depth map 216. In one or more embodiments, target resolution 220 is a lower resolution than the native/full resolution of real-time scan data 204a-n captured by image sensors 142a-n. In one or more embodiments, target resolution 220 is achieved by CPU 104 down-sampling native/ full resolution real-time scan data 204a-n. In down-sampling real-time scan data 204a-n, CPU 104 applies a down-sampling ratio (e.g., 4×4 ratio) that down-samples a width of each frame of real-time scan data 204a-n by a width factor (e.g., 4) and a height by a height factor (e.g., 4). In another embodiment, in down-sampling real-time scan data 204a-n, based on the down-sampling ratio, CPU 104 removes every Nth row (e.g., every 4th row) and every Nth column (e.g., every 4th column) in each frame of real-time scan data 204a-n. In one example, for scenes having a higher rate of motion, CPU 104 calculates a target resolution 220 associated with an 8×8 down-sampling ratio of real-time scan data 204a-n. In another example, for scenes having a lower rate of motion, CPU 104 calculates a target resolution 220 associated with a 4×4 down-sampling ratio of real-time scan data 204a-n. It should be noted that the above down-sampling ratios for target resolution 220 are provided as examples and that CPU 104 may apply different down-sampling ratios to real-time scan data 204a-n.

In one or more embodiments, in response to determining rate of motion 214, CPU 104 accesses database 210 to retrieve a pre-determined target frame rate (target frame rate 218) and a pre-determined down-sampling rate that corresponds to the determined rate of motion 214. Database 210 includes entries 212a-n. Each of entries 212a-n establishes a target frame rate (e.g., target frame rate 304a-n of FIG. 3) and a down-sampling rate (e.g., down-sampling rate 306a-n of FIG. 3) and/or target resolution for a particular rate of motion value and/or range of values. In one embodiment, database 210 is stored within memory/storage (e.g., memory 110) of image capturing device 100. In another embodiment, database 210 may be located within a storage of a remote device (e.g., server 154 of FIG. 1) that is accessible to image capturing device 100 via a network (e.g., network 150 of FIG. 1).

In another embodiment, CPU 104 analyzes rate of motion 214 and/or the movement in synchronized frames 206. Based on the rate of motion 214 and an identified movement speed of at least one object in the current scene, as captured within synchronized frames 206, CPU 104 calculates minimum frame rate 224. Minimum frame rate 224 is a lowest frame rate that still enables the detected motion in the current scene to be captured with minimal or no distortion and/or blur of objects within the current scene. For example, in response to determining a fast-moving object exists in the current scene, CPU 104 may calculate minimum frame rate 224 at a higher frame rate (e.g., thirty frames per second) in order to effectively capture the fast-moving object, with minimal or no distortion and/or blur, by image sensors 142a-n. For example, in response to determining a slow-moving object exists in the current scene, CPU 104 may calculate minimum frame rate 224 at a lower frame rate (e.g., 10 frames per second) in order to effectively capture the slow-moving object, with minimal or no distortion and/or blur, by image sensors 142a-n. In response to determining minimum frame rate 224, CPU 104 establishes minimum frame rate 224 as target frame rate 218, and determines calculation time 222, which represents a maximum calculation time (e.g., 3 ms) needed/allotted for CPU 104 to calculate each frame of a real-time depth map 216. In one embodiment, calculation time 222 is a pre-established value. In another embodiment, CPU 104 calculates calculation time 222 based on a number or type of application executing thereon and/or hardware specifications and/or limitations of image capturing device 100, such as a clock speed of CPU 104, a system bus speed, and/or memory bandwidth of a memory (e.g., memory 110). In response to determining calculation time 222 and target frame rate 218 (e.g., minimum frame rate 224), CPU 104 calculates, as target resolution 220, a maximum resolution of real-time depth map 216 that may be achieved while calculating each frame of real-time depth map 216 within calculation time 222 at target frame rate 218. The maximum resolution is a highest resolution at which CPU 104 can generate each frame of real-time depth map 216 at a calculation time that is less than or equal to calculation time 222 as calculated by CPU 104.

In response to calculating target frame rate 218 and target resolution 220 for real-time depth map 216, CPU 104 generates, from real-time scan data 204a-n, real-time depth map 216 at the calculated target frame rate 218 and target resolution 220. In generating real-time depth map 216, CPU 104 combines real-time scan data 204a-n generated by image sensors 142a-n at a rate corresponding to target frame rate 218. In one or more embodiments, CPU 104 down-samples real-time scan data 204a-n to match target resolution 220 prior to combining real-time scan data 204a-n to generate real-time depth map 216. In one or more embodiments, CPU 104 generates real-time depth map 216 based on a known physical distance between image sensor 142a and image sensor 142n and a difference in perspective of each object in scene 202 as viewed by image sensor 142a and image sensor 142n. Real-time depth map 216 identifies an estimated distance from image capturing device 100 to each object in scene 202. In one or more embodiments, scene 202 is continually monitored/analyzed by image sensors 142a-n to update real-time depth map 216 in real time. In another embodiment, image capturing device 100 utilizes sensors, such as time-of-flight emitters/receivers and structured light emitters/receivers (not pictured) in combination with at least one of image sensors 142a-n to assist in the generation of real-time depth map 216.

In one or more embodiments, CPU 104 reconfigures image sensors 142a-n to capture real-time scan data 204a-n at target frame rate 218 prior to combining real-time scan data 204a-n to generate real-time depth map 216. In one or more embodiments, real-time depth map 216 may be used to focus a lens of image sensors 142a-n during capture of images and/or video. In another embodiment, real-time depth map 216 may be provided to an output device, such as display 145.

It should be noted that in one or more embodiments, CPU 104 continues to monitor rate of motion 214 in the current scene while generating real-time depth map 216. In response to determining rate of motion 214 has changed, CPU 104 may dynamically recalculate target frame rate 218 and target resolution 220 to generate real-time depth map 216, which is optimized for the current scene.

Figure 3:
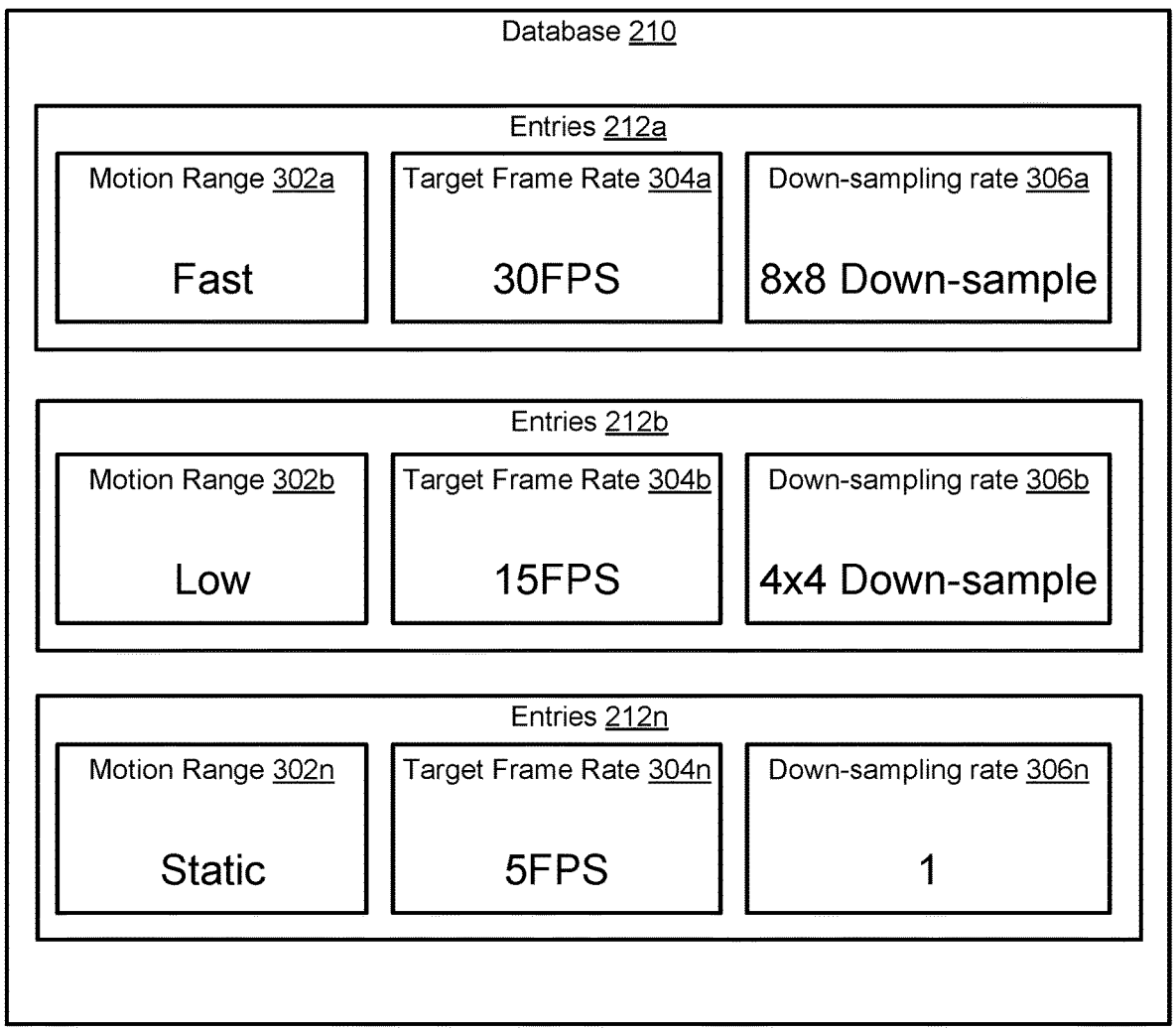
FIG. 3 illustrates an example database, in accordance with one or more embodiments.

Referring now to FIG. 3, there is depicted an example database, in accordance with one or more embodiments. Database 210 includes entries 212a-n. Entries 210a-n include motion ranges 302a-n, target frame rate 304a-n, and down-sampling rate 306a-n. Motion ranges 302a-n establishes a particular rate of motion and may also be associated with at least one rate of motion value and/or a range of motion values. Target frame rate 304a-n establishes a target frame rate of real-time depth map 216 for rates of motion within a corresponding motion range 302a-n. Down-sampling rates 306a-n establish a particular down-sampling rate of real-time depth map 216 for rates of motion within a corresponding motion range 302a-n. As illustrated, a fast-motion range (motion range 302a) is associated with a 30 FPS target frame rate (target frame rate 304a) and an 8×8 down-sampling rate (down-sampling rate 306a). A slow-motion range (motion range 302b) is associated with a 15 FPS target frame rate (target frame rate 304b) and an 4×4 down-sampling rate (down-sampling rate 306b). A static motion range (motion range 302n) is associated with a 5 FPS target frame rate (target frame rate 304n) and has a down-sampling rate (down-sampling rate 306n) of 1. At a down-sampling rate of 1, CPU 104 performs no down-sampling of real-time scan data and generates a real-time depth map at the native/full resolution of image sensors 142a-n.

Figure 4:
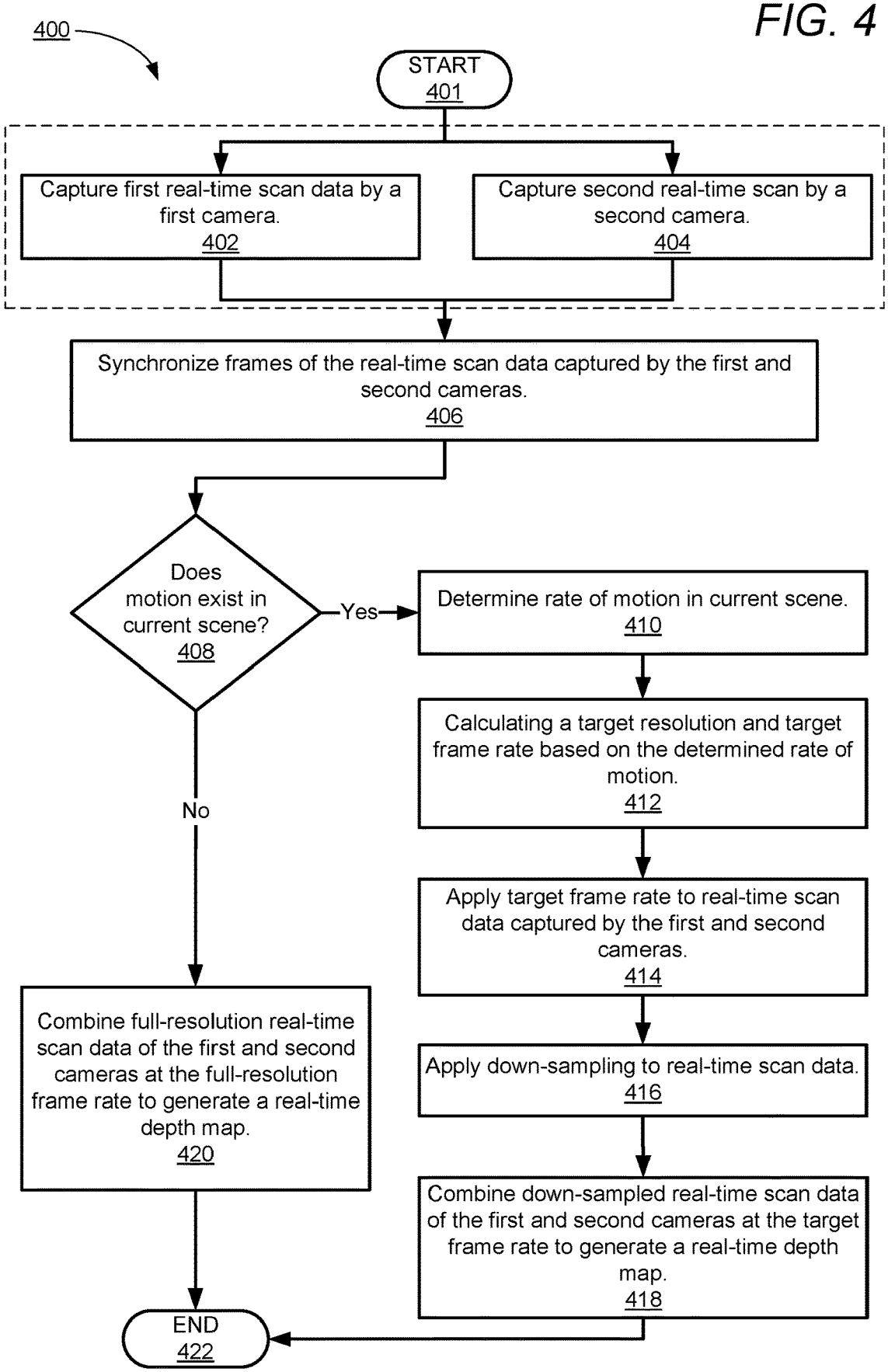
FIG. 4 is a flow chart illustrating a method for dynamically adjusting sampling of a depth map based on detected motion in a current scene, in accordance with one or more embodiments.
Figure 5:
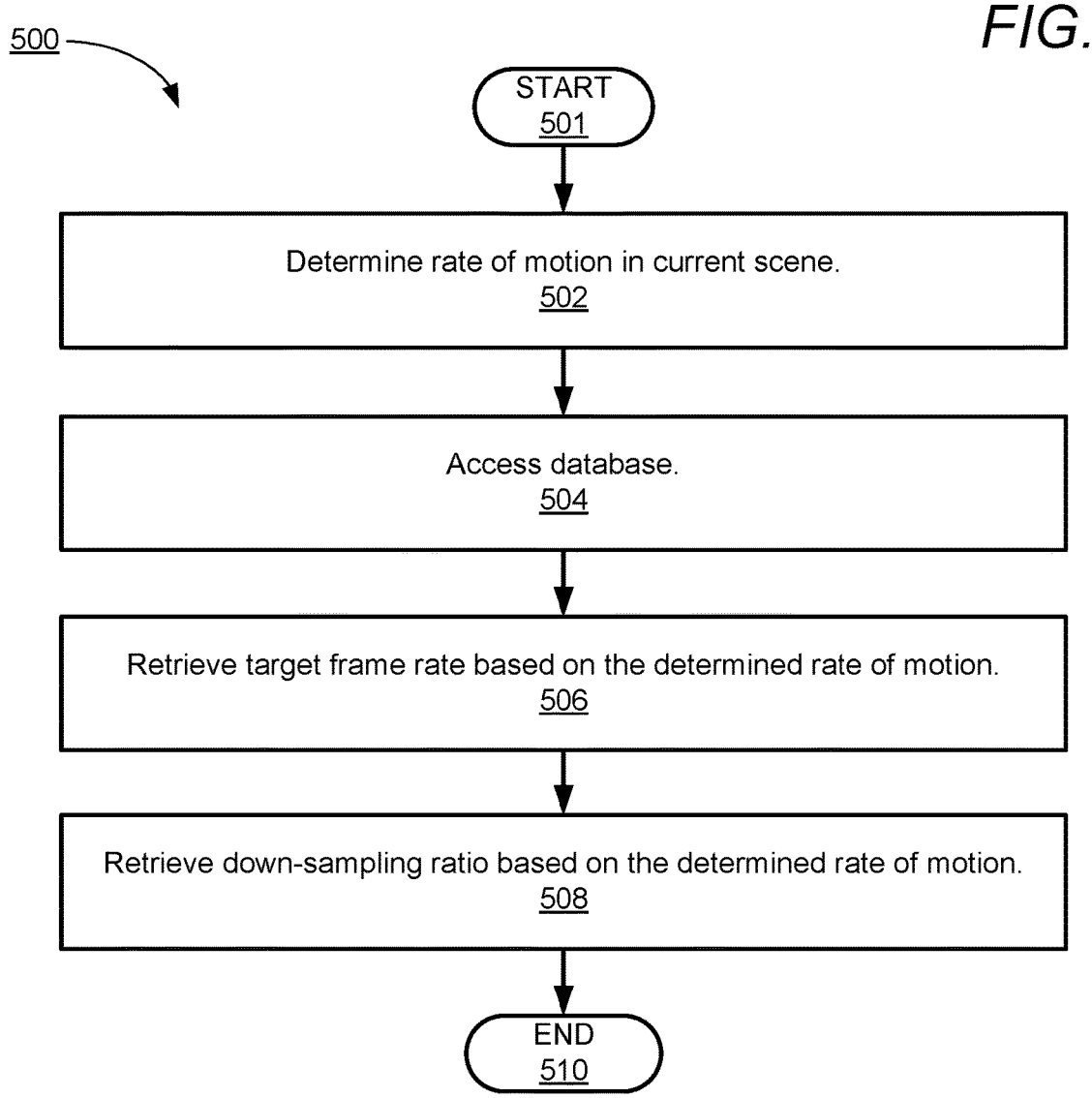
FIG. 5 is a flow chart illustrating a method for retrieving a target frame rate and down-sampling rate from a database based on a rate of motion in a current scene, in accordance with one or more embodiments.
Figure 6:
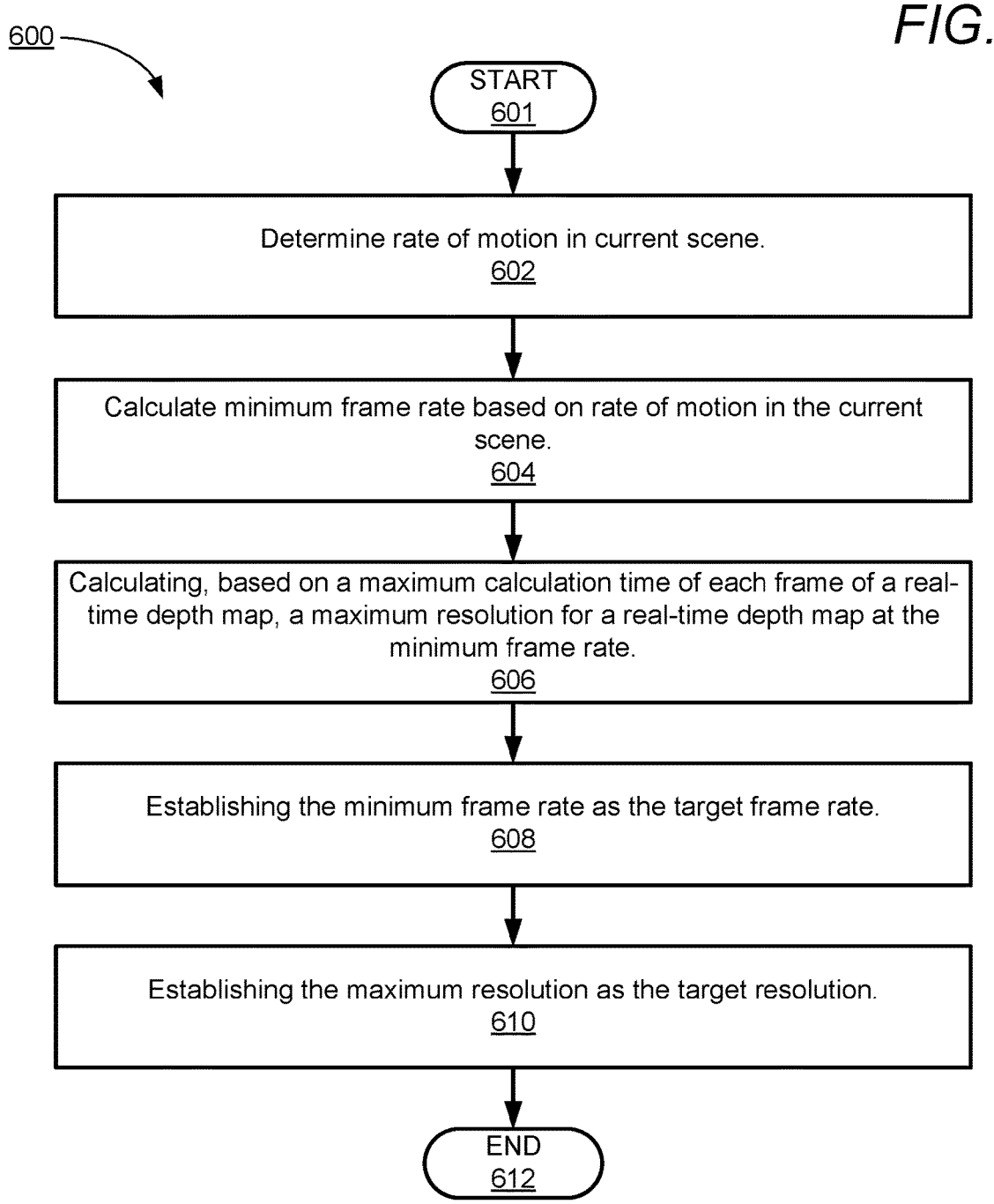
FIG. 6 is a flow chart illustrating a method for calculating a target frame rate and target resolution based on a rate of motion in a current scene, in accordance with one or more embodiments.

Referring now to FIGS. 4-6, there are depicted high-level flow charts illustrating methods that can be implemented by a processor (e.g., CPU 104) executing software code of DMU 117 within an image capturing device (e.g., image capturing device 100). Aspects of the methods depicted in FIGS. 4-6 are described with reference to the components of FIGS. 1 and 2. The method processes described in FIGS. 4-6 are generally described as being performed by components of image capturing device 100.

Referring now to FIG. 4, there is depicted a high-level flow-chart illustrating a method for dynamically adjusting sampling of a depth map based on detected motion in a current scene, in accordance with one or more embodiments of the present disclosure. Method 400 commences at initiator block 401 then proceeds to block 402. At block 402, CPU 104 captures first real-time scan data of a current scene at a first resolution by a first camera. At block 404, CPU 104 contemporaneously captures real-time scan data of a current scene at a first resolution by a second camera. In one or more embodiments, the first resolution corresponds to a full-resolution of at least one of the first camera and the second camera. At block 406, CPU 104 synchronizes a plurality of frames within the real-time scan data captured by the first camera with a plurality of frames within the real-time scan data captured by the second camera to create a plurality of synchronized frames. At block 408, CPU 104 analyzes the plurality of synchronized frames to determine whether motion exists in the current scene. In response to determining motion does not exist in the current scene, method 400 continues to block 420 and CPU 104 combines, in real-time, the real-time scan data of the first and second cameras to generate a real-time depth map. Method 400 then terminates at block 422.

In response to determining that motion does exist in the current scene, method 400 continues to block 410 and CPU 104 determines a rate of motion in the current scene. At block 412, CPU 104 calculates a target resolution and a target frame rate based on the determined rate of motion. At block 414, CPU 104 applies the target frame rate to the real-time scan data of the first and second cameras. At block 416, CPU 104 applies a down-sampling to the real-time scan data of the first and second cameras based on the target resolution. At block 418, CPU 104 combines the down-sampled real-time scan data of the first and second cameras at the target frame rate to generate a real-time depth map. Method 400 then terminates at block 422.

Referring now to FIG. 5, there is depicted a high-level flow-chart illustrating a method for retrieving a target frame rate and down-sampling rate from a database based on a rate of motion in a current scene, in accordance with one or more embodiments of the present disclosure. In one or more embodiments, the processes described in FIG. 5 may be performed in block 412 of method 400 of FIG. 4. Method 500 commences at initiator block 501 then proceeds to block 502. At block 502, CPU 104 analyzes a motion of at least one object within synchronized frames captured by image sensors and determines, based on the detected motion of the at least one object, a rate of motion (rate of motion 214) within the current scene. At block 504, CPU 104 accesses database (database 210) containing entries (entries 212a-n) that specify target frame rates (target frame rates 304a-n) and down-sampling rates (down-sampling rates 306a-n) for a plurality of motion ranges (motion ranges 302a-n). At block 506, CPU 104 accesses an entry 212 that is associated with a motion range 302 corresponding to the determined rate of motion and retrieves a corresponding target frame rate. At block 508, CPU 104 retrieves a corresponding down-sampling rate from the same entry. Method 500 then terminates at block 510.

Referring now to FIG. 6, there is depicted a high-level flow-chart illustrating a method for calculating a target frame rate and target resolution based on a rate of motion in a current scene, in accordance with one or more embodiments of the present disclosure. In one or more embodiments, the processes described in FIG. 6 may be performed in block 412 of method 400 of FIG. 4. Method 600 commences at initiator block 601 then proceeds to block 602. At block 602, CPU 104 determines a rate of motion (rate of motion 214) in the current scene. At block 604, CPU 104 calculates, based on the rate of motion, a minimum frame rate of a real-time depth map that still enables the detected motion in the current scene to be captured with minimal or no distortion and/or blur of objects within the current scene. At block 606, CPU 104 calculates a maximum resolution of each frame of the real-time depth map based on the minimum frame rate and a maximum calculation time (e.g., calculation time 222) of CPU 104 for each frame of a real-time depth map. In one embodiment, CPU 104 may retrieve a pre-determined maximum calculation time from a memory or storage of image capturing device 100. In another embodiment, CPU 104 dynamically calculates maximum calculation time based on applications/processes currently executing thereon and/or processing capabilities and/or a current system state of image capturing device 100. At block 608, CPU 104 establishes the minimum frame rate as the target frame rate. At block 610, CPU 104 establishes the maximum resolution as the target resolution. Method 600 then terminates at block 612.

In the above-described flow chart of FIG. 4-6, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   capturing real-time scan data by a first camera and a second camera of an image capturing device;
   synchronizing, by a processor, a first plurality of frames of the real-time scan data captured by the first camera with a second plurality of frames captured by the second camera to create a plurality of synchronized frames at a first frame rate;
   analyzing the plurality of synchronized frames to determine whether motion exists within the current scene;
   in response to determining motion exists within the current scene:
      determining, based on the plurality of synchronized frames, a rate of motion within the current scene;
      dynamically calculating a target resolution and a target frame rate based on the rate of motion; and
      generating, from the real-time scan data, a real-time depth map at the target resolution and target frame rate; and
   in response to the analysis of the plurality of synchronized frames indicating that the current scene is a static scene, combining, by the processor, the real-time scan data captured by the first camera and the second camera at the first frame rate to generate a full-resolution real-time depth map of the current scene at the first frame rate and a full resolution of at least one of the first camera and the second camera.

2. The method of claim 1, wherein calculating the target resolution and the target frame rate further comprises:
   selecting, based on the determined rate of motion, a second resolution that is lower than a full resolution of at least one of the first camera and the second camera as the target resolution; and
   selecting, based on the determined rate of motion, a second frame rate that is higher than the first frame rate as the target frame rate.

3. The method of claim 2, wherein generating the real-time depth map further comprises:
   down-sampling the real-time scan data to the second resolution based on the determined rate of motion; and
   combining, by the processor, the down-sampled real-time scan data captured by the first camera and the second camera at the second frame rate to generate the real-time depth map at the second frame rate and the second resolution.

4. The method of claim 1, further comprising:
   in response to determining motion exists within the current scene:
      determining whether the rate of motion corresponds to a high-speed motion range; and
      in response to determining the rate of motion corresponds to a high-speed motion range:

selecting, from a database, a high-motion resolution that is lower than a full resolution of at least one of the first camera and the second camera as the target resolution;

selecting, from the database, a high-motion frame rate that is higher than the first frame rate as the target frame rate;

down-sampling the real-time scan data to the high-motion resolution; and combining, by the processor, the down-sampled real-time scan data captured by the first camera and the second camera at the high-motion frame rate to generate the real-time depth map at the high-motion frame rate and the high-motion resolution.

5. The method of claim 4, further comprising:

in response to determining motion exists within the current scene:

determining whether the rate of motion corresponds to a low-speed motion range; and in response to determining the rate of motion corresponds to a low-speed motion range:

selecting, from the database, a low-motion resolution that is lower than the full resolution and higher than the high-motion resolution as the target resolution;

selecting, from the database, a low-motion frame rate that is higher than the first frame rate and lower than the high-motion frame rate as the target frame rate;

down-sampling the real-time scan data to the low-motion resolution; and combining, by the processor, the down-sampled real-time scan data captured by the first camera and the second camera at the low-motion frame rate to generate the real-time depth map at the low-motion frame rate and the low-motion resolution.

6. The method of claim 1, wherein dynamically calculating the target resolution and the target frame rate further comprises:

calculating, based on the rate of motion, a minimum frame rate to capture the motion within the current scene;

calculating a maximum resolution of the real-time depth map based on the minimum frame rate and a maximum calculation time of each frame of a real-time depth map;

establishing the minimum frame rate as the target frame rate; and establishing the maximum resolution as the target resolution.

7. An image capturing device comprising:

a first camera that captures a first scan data of a current scene at a full resolution;

a second camera that captures a second scan data of the current scene at the full resolution; and at least one processor that:

synchronizes the first scan data and the second scan data to create a plurality of synchronized frames at a first frame rate;

analyzes the plurality of synchronized frames to determine whether motion exists within the current scene;

in response to determining motion exists within the current scene:

determines, based on the plurality of synchronized frames, a rate of motion within the current scene;

dynamically calculates a target resolution and a target frame rate based on the rate of motion; and generates, from the real-time scan data, a real-time depth map at the target resolution and target frame rate; and in response to determining that the analysis of the plurality of synchronized frames indicates that the current scene is a static scene, combines the real-time scan data captured by the first camera and the second camera at the first frame rate to generate a full-resolution real-time depth map of the current scene at the first frame rate and the full resolution.

8. The image capturing device of claim 7, wherein in calculating the target resolution and the target frame rate, the at least one processor:

selects, based on the rate of motion, a second resolution that is lower than the full resolution as the target resolution; and selects, based on the rate of motion, a second frame rate that is higher than the first frame rate as the target frame rate.

9. The image capturing device of claim 8, wherein in generating the real-time depth map, the at least one processor:

down-samples the real-time scan data to the second resolution based on the determined rate of motion; and combines the down-sampled real-time scan data captured by the first camera and the second camera at the second frame rate to generate the real-time depth map at the second frame rate and the second resolution.

10. The image capturing device of claim 7, wherein in response to determining motion exists within the current scene, the at least one processor:

determines whether the rate of motion corresponds to a high-speed motion range; and in response to determining the rate of motion corresponds to a high-speed motion range:

selects, from a database, a high-motion resolution that is lower than the full resolution as the target resolution;

selects, from the database, a high-motion frame rate that is higher than the first frame rate as the target frame rate;

down-samples the real-time scan data to the high-motion resolution; and combines the down-sampled real-time scan data captured by the first camera and the second camera at the high-motion frame rate to generate the real-time depth map at the high-motion frame rate and the high-motion resolution.

11. The image capturing device of claim 10, wherein in response to determining motion exists within the current scene, the at least one processor:

determines whether the rate of motion corresponds to a low-speed motion range; and in response to determining the rate of motion corresponds to a low-speed motion range:

selects, from the database, a low-motion resolution that is lower than the full resolution and higher than the high-motion resolution as the target resolution;

selects, from the database, a low-motion frame rate that is higher than the first frame rate and lower than the high-motion frame rate as the target frame rate;

down-samples the real-time scan data to the low-motion resolution; and combines, by the processor, the down-sampled real-time scan data captured by the first camera and the second camera at the low-motion frame rate to generate the real-time depth map at the low-motion frame rate and the low-motion resolution.

12. The image capturing device of claim 7, wherein in calculating the target resolution and the target frame rate, the processor:
   calculates, based on the rate of motion, a minimum frame rate to capture the motion within the current scene;
   calculates a maximum resolution of the real-time depth map based on the minimum frame rate and a maximum calculation time of each frame of a real-time depth map;
   establishes the minimum frame rate as the target frame rate; and
   establishes the maximum resolution as the target resolution.

13. A computer program product comprising:
   a computer readable storage device; and
   program code on the computer readable storage device that, when executed by a processor associated with an image capturing device, configures the image capturing device to provide the functionality of:
   capturing real-time scan data at a full resolution by a first camera and a second camera of an image capturing device;
   synchronizing, by a processor, a first plurality of frames of the real-time scan data captured by the first camera with a second plurality of frames captured by the second camera to create a plurality of synchronized frames at a first frame rate;
   analyzing the plurality of synchronized frames to determine whether motion exists within the current scene;
   in response to determining motion exists within the current scene:
      determining, based on the plurality of synchronized frames, a rate of motion within the current scene;
      dynamically calculating a target resolution and a target frame rate based on the rate of motion; and
      generating, from the real-time scan data, a real-time depth map at the target resolution and target frame rate; and
   in response to the analysis of the plurality of synchronized frames indicating that the current scene is a static scene, combining the real-time scan data captured by the first camera and the second camera at the first frame rate to generate a full-resolution real-time depth map of the current scene at the first frame rate and the full resolution.

14. The computer program product of claim 13, the program code for calculating the target resolution and the target frame rate further comprising code for:
   selecting, based on the determined rate of motion, a second resolution that is lower than the full resolution as the target resolution; and
   selecting, based on the determined rate of motion, a second frame rate that is higher than the first frame rate as the target frame rate.

15. The computer program product of claim 14, the program code for generating the real-time depth map further comprising code for:
   down-sampling the real-time scan data to the second resolution based on the determined rate of motion; and
   combining, by the processor, the down-sampled real-time scan data captured by the first camera and the second camera at the second frame rate to generate the real-time depth map at the second frame rate and the second resolution.

16. The computer program product of claim 13, the program code further comprising code for:
   in response to determining motion exists within the current scene:
      determining whether the rate of motion corresponds to a high-speed motion range; and
      in response to determining the rate of motion corresponds to a high-speed motion range:
         selecting, from a database, a high-motion resolution that is lower than a full resolution of at least one of the first camera and the second camera as the target resolution;
         selecting, from the database, a high-motion frame rate that is higher than the first frame rate as the target frame rate;
         down-sampling the real-time scan data to the high-motion resolution; and
         combining, by the processor, the down-sampled real-time scan data captured by the first camera and the second camera at the high-motion frame rate to generate the real-time depth map at the high-motion frame rate and the high-motion resolution.

17. The computer program product of claim 16, the program code further comprising code for:
   in response to determining motion exists within the current scene:
      determining whether the rate of motion corresponds to a low-speed motion range; and
      in response to determining the rate of motion corresponds to a low-speed motion range:
         selecting, from the database, a low-motion resolution that is lower than the full resolution and higher than the high-motion resolution as the target resolution;
         selecting, from the database, a low-motion frame rate that is higher than the first frame rate and lower than the high-motion frame rate as the target frame rate;
         down-sampling the real-time scan data to the low-motion resolution; and
         combining, by the processor, the down-sampled real-time scan data captured by the first camera and the second camera at the low-motion frame rate to generate the real-time depth map at the low-motion frame rate and the low-motion resolution.

18. The computer program product of claim 13, the program code for dynamically calculating the target resolution and the target frame rate further comprising code for:
   calculating, based on the rate of motion, a minimum frame rate to capture the motion within the current scene;
   calculating a maximum resolution of the real-time depth map based on the minimum frame rate and a maximum calculation time of each frame of a real-time depth map;
   establishing the minimum frame rate as the target frame rate; and
   establishing the maximum resolution as the target resolution.

* * * * *